United States Patent
Koo et al.

(10) Patent No.: US 12,230,445 B2
(45) Date of Patent: Feb. 18, 2025

(54) MULTILAYER ELECTRONIC COMPONENT

(71) Applicant: SAMSUNG ELECTRO-MECHANICS CO., LTD., Suwon-si (KR)

(72) Inventors: Bon Hyeong Koo, Suwon-si (KR); Seok Hyun Yoon, Suwon-si (KR); In Ho Jeon, Suwon-si (KR); Byung Kil Yun, Suwon-si (KR); Se Yong Kim, Suwon-si (KR); Min Jung Jang, Suwon-si (KR); Geon Hoi Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 160 days.

(21) Appl. No.: 18/136,418

(22) Filed: Apr. 19, 2023

(65) Prior Publication Data

US 2024/0234032 A1 Jul. 11, 2024

(30) Foreign Application Priority Data

Jan. 10, 2023 (KR) .................. 10-2023-0003409

(51) Int. Cl.
| | |
|---|---|
| H01G 4/12 | (2006.01) |
| C04B 35/626 | (2006.01) |
| H01G 4/008 | (2006.01) |
| H01G 4/012 | (2006.01) |
| H01G 4/30 | (2006.01) |

(52) U.S. Cl.
CPC ....... *H01G 4/1227* (2013.01); *C04B 35/6262* (2013.01); *H01G 4/008* (2013.01); *H01G 4/012* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 3,472,614 A | * | 10/1969 | Jugle | C01G 23/006 |
| | | | | 423/598 |
| 9,093,221 B2 | * | 7/2015 | Mizuno | C04B 35/4682 |
| 11,769,634 B2 | * | 9/2023 | Keum | H01G 4/1218 |
| | | | | 361/321.2 |

(Continued)

FOREIGN PATENT DOCUMENTS

| | | |
|---|---|---|
| CN | 113582683 A | 11/2021 |
| JP | 2021-009993 A | 1/2021 |
| JP | 2021-177512 A | 11/2021 |

OTHER PUBLICATIONS

Search Report dated Oct. 30, 2023 issued in corresponding European Patent Application No. 23170664.9.

*Primary Examiner* — Dion R. Ferguson
(74) *Attorney, Agent, or Firm* — Morgan, Lewis & Bockius LLP

(57) ABSTRACT

A multilayer electronic component includes a body including a dielectric layer and internal electrodes; and an external electrode disposed on the body, wherein the dielectric layer includes dielectric grains, wherein at least one of the dielectric grains includes a twin boundary, and wherein the dielectric layer includes a region in which a sum of lengths of the twin boundaries included in a 2 μm×2 μm region is 1.49 μm or more.

20 Claims, 5 Drawing Sheets

(56) References Cited

U.S. PATENT DOCUMENTS

| | | | |
|---|---|---|---|
| 2013/0258547 A1* | 10/2013 | Mizuno | B82Y 30/00 |
| | | | 361/301.4 |
| 2013/0258548 A1* | 10/2013 | Mizuno | H01G 4/30 |
| | | | 361/301.4 |
| 2020/0411241 A1* | 12/2020 | Hashimoto | H01G 4/0085 |
| 2021/0350982 A1* | 11/2021 | Saito | C04B 35/6262 |
| 2024/0013978 A1* | 1/2024 | Yoon | H01G 4/1227 |
| 2024/0234032 A1* | 7/2024 | Koo | H01G 4/1218 |

\* cited by examiner

MULTILAYER ELECTRONIC COMPONENT

CROSS-REFERENCE TO RELATED APPLICATION(S)

This application claims benefit of priority to Korean Patent Application No. 10-2023-0003409 filed on Jan. 10, 2023 in the Korean Intellectual Properties Office, the disclosure of which is incorporated herein by reference in its entirety.

BACKGROUND

1. Technical Field

The present disclosure relates to a multilayer electronic component.

2. Description of Related Art

A multilayer electronic component (MLCC), which is one of multilayer electronic components, may be a chip-type condenser mounted on the printed circuit boards of various types of electronic products such as imaging devices including a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor may have a small size and high capacitance thereof and may be easily mounted. As various electronic devices such as computers and mobile devices have been miniaturized and implemented with high-output capacitance, demand for miniaturization and high capacitance multilayer ceramic capacitors has increased.

Recently, as the automotive MLCC market requiring high reliability has expanded, demand for the automotive component MLCC has rapidly increased. Control of microcurrent may be important for the automotive MLCC, and high rated voltage and high reliability may be required as compared to the same capacitance so as to be driven in a harsh environment such as an environment featuring high temperature, humidity, and external shocks or vibrations.

To implement such an MLCC, a size of dielectric grain should be small and the number of grain boundaries should be increased. Also, among additive elements, valence fixed acceptors, valence variable acceptors, and rare earth elements have a great influence on reliability, and manufacturing a chip having excellent reliability by optimizing the composition ratio of the elements may address the issue in the MLCC field. Moreover, even with the same dielectric composition, a variation in properties may significantly increase depending on a microstructure, a degree of solidarity and distribution of elements, and process conditions, and thus, the importance of optimal composition design has been increased.

SUMMARY

An example embodiment of the present disclosure is to provide a multilayer electronic component having improved DC-bias properties, high-temperature properties, withstand voltage properties and reliability by forming twin, which may be a surface defect in dielectric.

According to an example embodiment of the present disclosure, a multilayer electronic component includes a body including a dielectric layer and internal electrodes; and an external electrode disposed on the body, wherein the dielectric layer includes a plurality of dielectric grains, wherein at least one of the plurality of dielectric grains includes a twin boundary, and wherein the dielectric layer includes a region in which a sum of lengths of twin boundaries included in a 2 μm×2 μm region is 1.49 μm or more.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
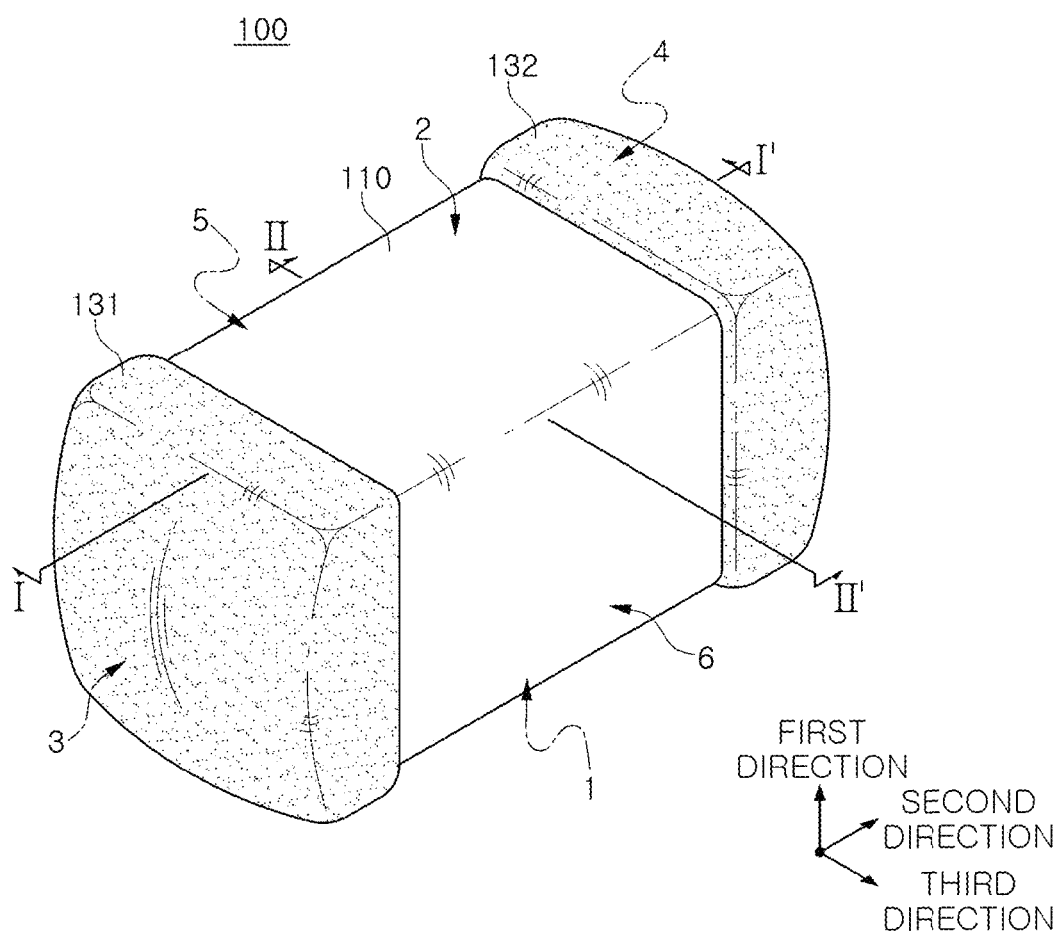
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
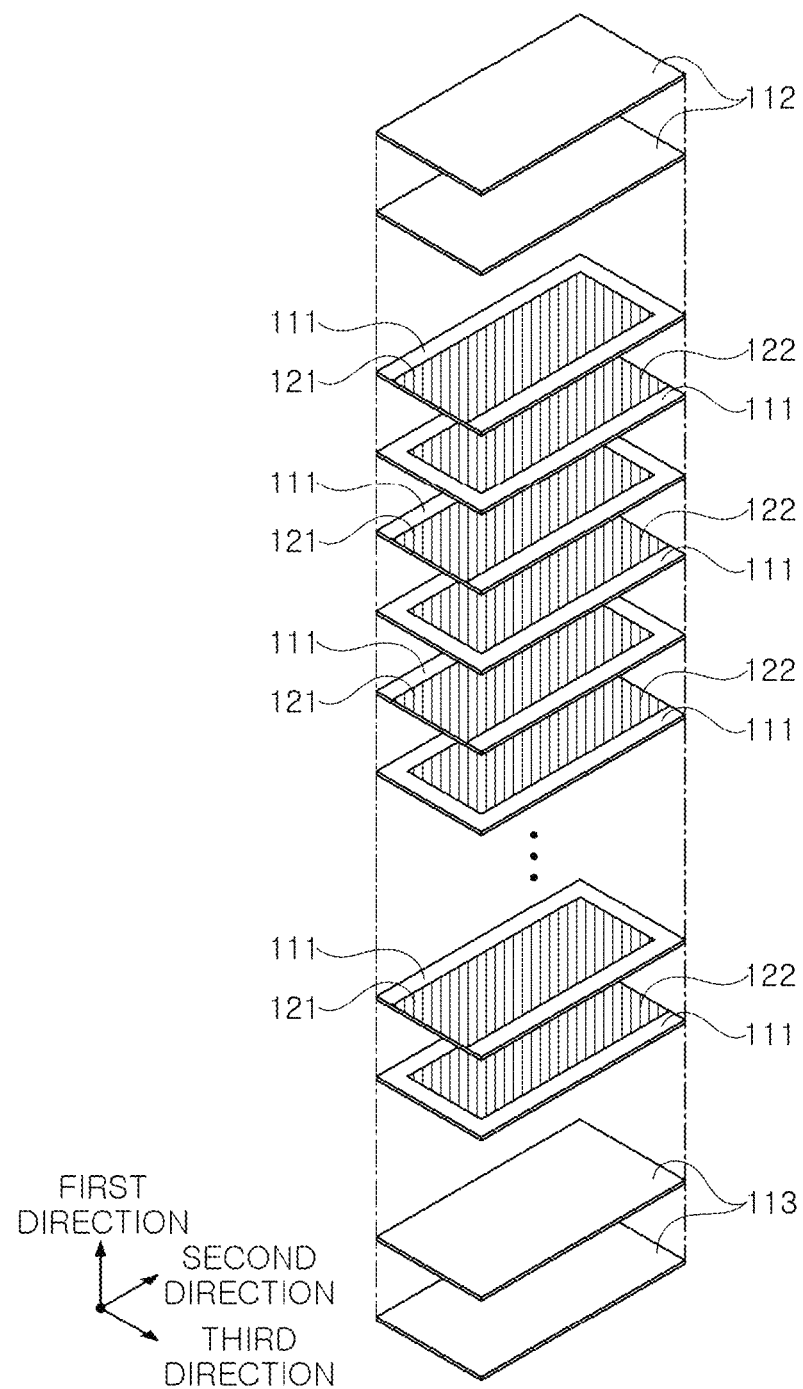
FIG. 2 is an exploded perspective diagram illustrating a laminate structure of internal electrodes according to an example embodiment of the present disclosure.

FIG. 2 is an exploded perspective diagram illustrating a laminate structure of internal electrodes according to an example embodiment.

Figure 3:
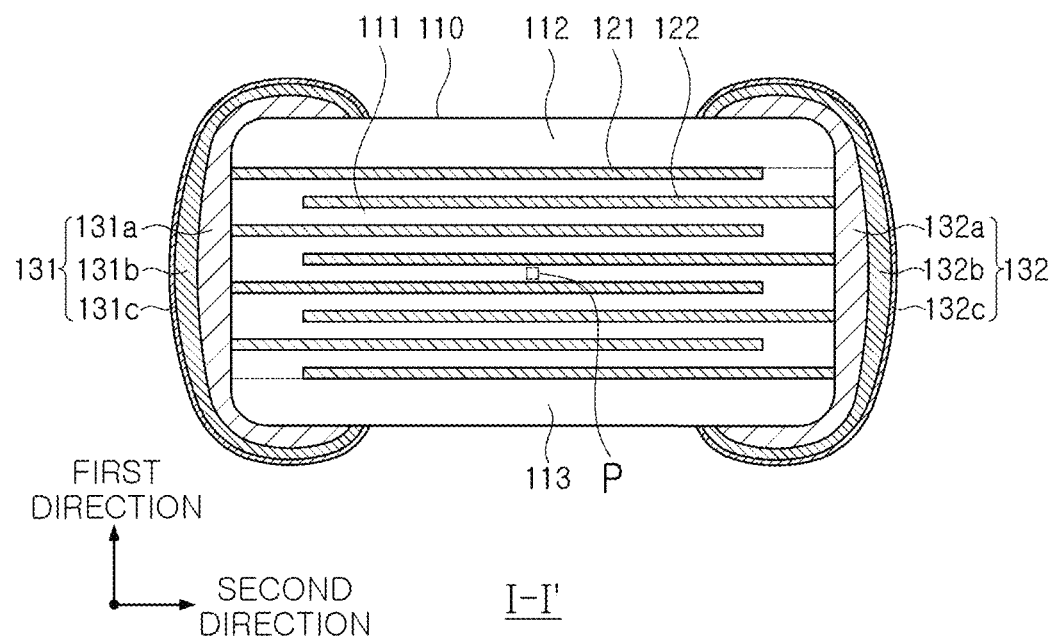
FIG. 3 is a cross-sectional diagram taken along line I-I' in FIG. 1.

FIG. 3 is a cross-sectional diagram taken along line I-I' in FIG. 1.

Figure 4:
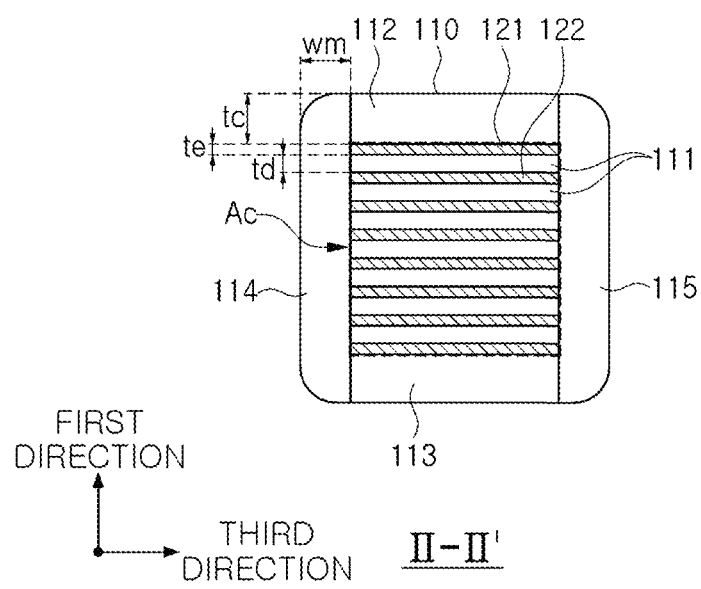
FIG. 4 is a cross-sectional diagram taken along line II-II' in FIG. 1.

FIG. 4 is a cross-sectional diagram taken along line II-II' in FIG. 1.

Figure 5:
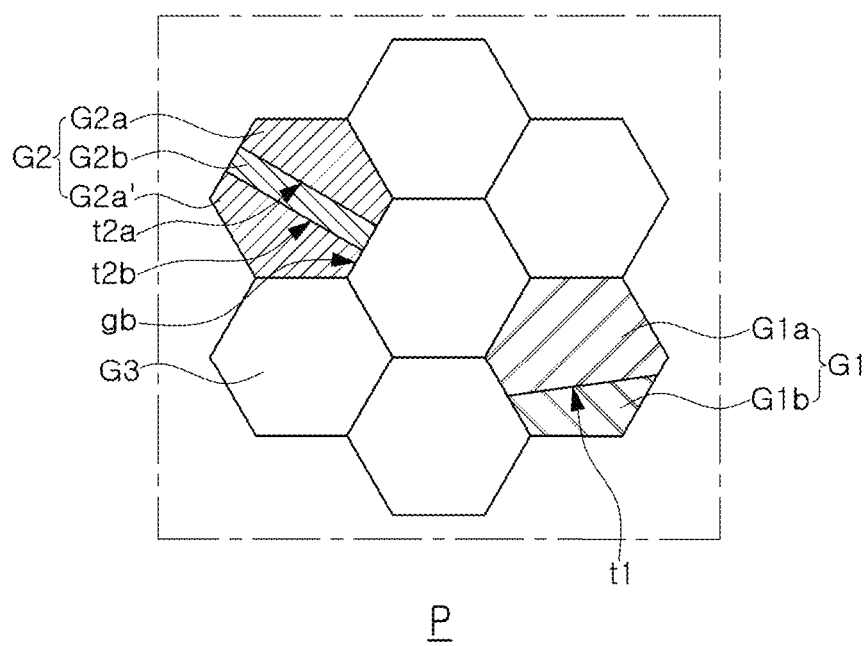
FIG. 5 is an enlarged diagram illustrating region P in FIG. 3.

FIG. 5 is an enlarged diagram illustrating region P in FIG. 3.

Figure 6A:
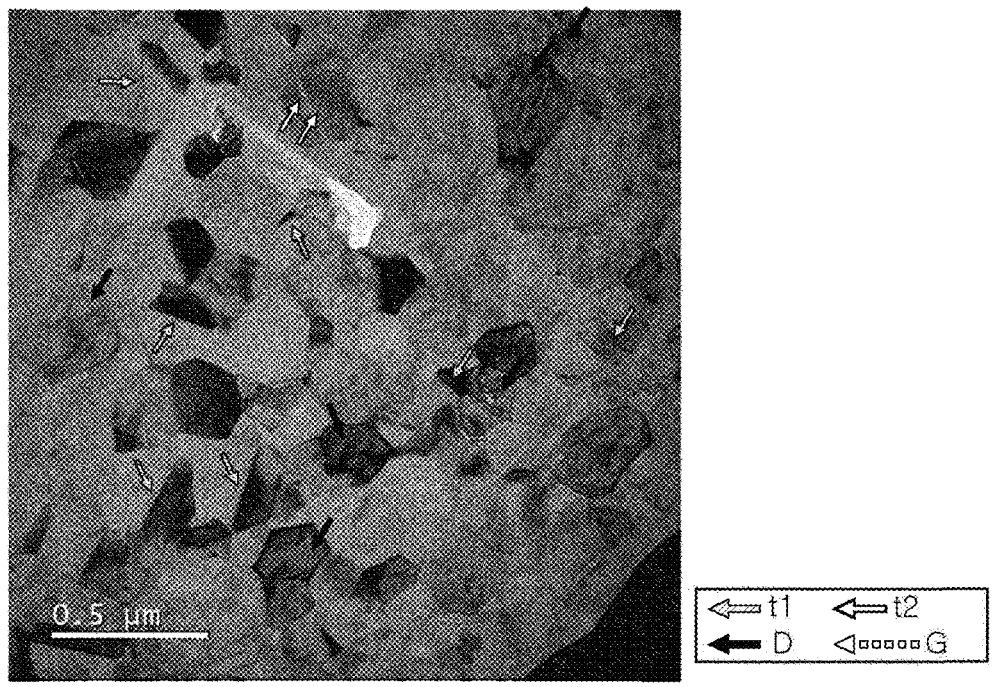
FIGS. 6A and 6B are images of a dielectric layer taken with a transmission electron microscope (TEM).
Figure 6B:
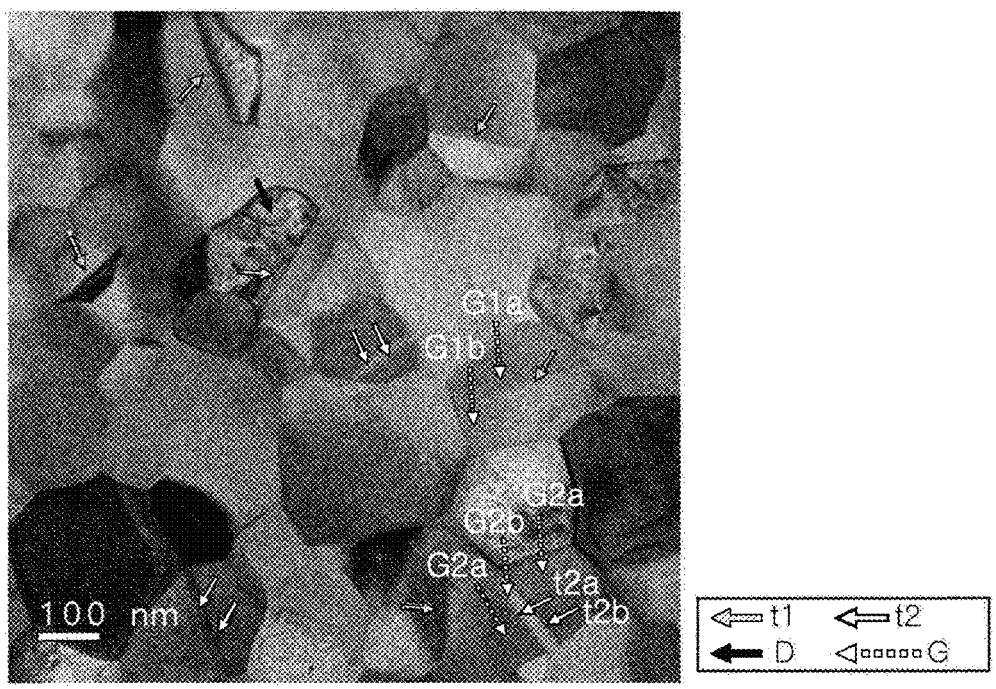

FIGS. 6A and 6B are images of a dielectric layer taken with a transmission electron microscope (TEM).

Hereinafter, a multilayer electronic component according to an example embodiment will be described in greater detail with reference to FIGS. 1 to 6. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a body 110 including a dielectric layer 111 and internal electrodes 121 and 122; and external electrodes 131 and 132 disposed on the body 110, and the dielectric layer 111 may include a plurality of dielectric grains G, at least one of the plurality of dielectric grains G may include a twin boundary t, and the dielectric layer 111 may include a region in which the sum of the lengths of the twin boundaries t included in the 2 μm×2 μm region is 1.49 μm or more.

In the body 110, the dielectric layers 111 and internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layer 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a sintering process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a sintered state, and a boundary between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium), Zr (zirconium) is partially solid-solute.

Also, various ceramic additives, organic solvents, binders, dispersants, or the like, may be added to a raw material for forming the dielectric layer 111 in the example embodiment such to powder such as barium titanate ($BaTiO_3$).

The dielectric layer 111 may include a dielectric composition described below, and more specifically, the dielectric layer 111 may be formed using a dielectric composition. In this case, the dielectric composition may include various elements, and the content of the elements included in the dielectric composition may not change significantly before and after sintering unless there are special circumstances. In other words, the content of the additive element added to the dielectric composition before sintering may be the same as the content of the element included in the dielectric grain G after sintering, or may change slightly within the range satisfying the numerical range, but may not be out of the numerical range.

The subcomponent included in the dielectric composition may be added as an oxide or carbonate type additive, but after the dielectric composition is sintered, the subcomponent may not be in an oxide or carbonate form, but may be solid solute in a dielectric material such as $BaTiO_3$, or may be present in in a form in which an element site is substituted.

An example of a method of measuring the content of each element included in the dielectric layer 111 will be described.

In the case of the destruction method, the components in the dielectric grains in the center of the chip may be analyzed using (S) TEM-EDS. First, in the region including the dielectric layer among the cross-sections of the sintered body, a thinned analysis sample may be prepared using a focused ion beam (FIB) device. Also, the damaged layer on the surface of the thinned sample may be removed using Ar ion milling, and mapping and quantitative analysis of each component may be performed in the image obtained using (S)TEM-EDS. In this case, the quantitative analysis graph of each component may be obtained in a mass fraction (wt %) of each element, which may also be presented in terms of a mole fraction (mol %). Other methods and/or tools appreciated by one of ordinary skill in the art, even if not described in the present disclosure, may also be used.

As another method, the chip may be crushed, the internal electrode may be removed, a portion of the dielectric layer may be selected, and components of the selected dielectric layer may be analyzed using devices such as an inductively coupled plasma spectrometer (ICP-OES) and an inductively coupled plasma mass spectrometer (ICP-MS).

As the market for MLCC for automotive electronics as well as MLCC for IT expands, demand for products having high rated voltage and excellent reliability in the same capacitance range has increased. Generally, the smaller the grain size and the more grain boundaries, the better the reliability of the dielectric may be. Among MLCC dielectric composition additive elements, the effect of valence fixed acceptor, valence variable acceptor transition metal element, and rare earth element on reliability has been widely known, and generally, a condition with good reliability may be selected through optimization of the composition ratio of dielectric additive elements including the elements. While BME (Base Metal Electrode) MLCC has been industrialized, optimization of composition to improve reliability has been continuously conducted. However, even with the same dielectric composition, there may be a significance difference in reliability depending on the microstructure, the distribution and degree of solidarity of additive elements, and reliability may be dramatically improved by realizing a specific shape in the dielectric microstructure in addition to compositional factors.

The dielectrics of high-capacitance BME MLCCs such as the current X5R, X7R, X8R, and Y5V may be based on a material obtained by doping valence fixed acceptors such as Mg and Al and rare earth elements such as Y, Dy, Ho, and Er, which works as donor, in base materials such as $BaTiO_3$ or (Ba, Ca)(Ti, Ca)$O_3$, (Ba, Ca)(Ti, Zr)$O_3$ and Ba(Ti, Zr)$O_3$ in which Ca, Zr are partially dissolved, and adding additives such as valence variable acceptors such as Mn, V, and Cr, extra Ba, and $SiO_2$ or a sintering aid including the elements. Grain growth inhibition and reduction resistance may need to be implemented to realize normal capacitance and insulation properties of high-capacitance MLCC when sintered in a reducing atmosphere, and the two effects may be realized by adding an appropriate amount of valence fixed acceptor such as Mg. However, when only a valence fixed acceptor such as Mg is added, the withstand voltage properties and reliability of the dielectric may not be good, and by adding a transition metal element, which is a valence variable acceptor such as Mn and V, and a rare earth element together, the effect of improving withstand voltage and reliability may be obtained. Most of these elements may be co-doped together, and may be employed in the shell region of the $BaTiO_3$ base material grain and may form a core-shell structure to realize stable capacitance properties and reliability depending on the temperature of MLCC. Accordingly, it may be expected that reliability may be good when these additive elements are not segregated while being included in the secondary phase and may need to be well dissolved in a $BaTiO_3$ crystal lattice of the shell region.

The multilayer electronic component 100 in an example embodiment may provide a dielectric composition having excellent properties while reducing the use of additives which may cause side effects in the development of MLCC for electric vehicles requiring excellent DC-bias properties and high reliability.

Generally, a method of suppressing the grain growth of the dielectric and simultaneously inducing the solid solution of various additive elements to form a core-shell structure and to obtain target properties has been used. However, even when various elements are added, in the case in which the elements are not sufficiently disintegrated/mixed, segregation may occur or secondary phases may be formed, which may cause an uneven distribution of additives, and may have the adverse effect of increasing production costs due to the steep rise in raw material prices. In the example embodiment, by inducing strong grinding/mixing by intensifying milling on the dielectric composition including $BaTiO_3$ base material or $BaTiO_3$ and additives, thereby inducing twin generation due to stress in $BaTiO_3$ particles, and obtaining excellent DC-bias properties and high reliability.

In an example embodiment, the dielectric layer 111 may include a plurality of dielectric grains G, and at least one of the plurality of dielectric grains G may include a twin boundary t. In this case, the sum of the lengths of twin boundaries t included in an arbitrary 2 μm×2 μm region in the dielectric layer 111 may be 1.49 μm or more.

Twin may be a plane defect, and different crystal orientation in the particle may include different $BaTiO_3$ based on the twin boundary created in the $BaTiO_3$ particle. Oxygen vacancies which may move by an electric field within a particle may meet $BaTiO_3$ having a different orientation based on the twin boundary, and migration may be reduced and semiconductorization of $BaTiO_3$ may be prevented, such that reliability of a multilayer electronic component may be improved.

Twins may be commonly found or generated in environments to which high temperatures, high pressures, or mechanical stresses are applied. Depending on the shape of the twin, a contact twin in which the crystals forming the twin are completely separated by an interface, and a polysynthetic twin in which the twin boundary develops in parallel may be observed in a microstructure using an electron microscope. Here, the contact twin may be due to a single twin boundary, and the polysynthetic twin may be due to a double twin boundary. Other methods and/or tools appreciated by one of ordinary skill in the art, even if not described in the present disclosure, may also be used.

That is, twin boundary may include a single twin boundary having one twin boundary, and may also include multiple twin boundaries having two or more twin boundaries. In this case, when the number of twin boundaries is two, the twin boundaries may be referred to as a double twin boundary.

Also, since the twin boundary may act as a grain boundary within a single $BaTiO_3$ particle as an anti-phase boundary, it may be advantageous to obtain the target DC-bias properties.

The twin described in the example embodiment may refer to a dielectric crystal, more specifically, expression after crystal nucleation, and when strain is accumulated beyond the value of critical resolved shear stress (CRSS) in the crystal due to external stress, the lattice can be transformed to address this issue, and the transformation may be expressed as a twin.

A twin boundary may have various plane directions, and in particular, a plane direction of a twin boundary formed by external stress may have a {111} direction. That is, the twin boundary having the {111} plane direction may be formed by milling, which is an external stress. The plane direction may be determined by observing the dielectric grain under the TEM. Other methods and/or tools appreciated by one of ordinary skill in the art, even if not described in the present disclosure, may also be used.

In other words, twins may be formed by applying external stress to $BaTiO_3$ through milling, and by suppressing oxygen vacancy movement and forming physical boundaries by orientation differences generated in particles by twins, DC-bias properties may be improved. Also, since equal or excellent chip properties may be obtained by controlling the milling conditions even at a lower concentration than the general additive concentration, by reducing the use of raw materials, production costs may be reduced.

A twin may be divided into a plurality of regions having a mirror image within a dielectric grain G based on a twin boundary t. That is, a twin may have a dielectric grain symmetrical by 180° based on the twin boundary t.

The lattice arrangement and the twin boundary t in the dielectric grain G may or may have an angle of up to 54.7°, and to create a twin, shear displacement may need to be applied in the ⅓<121> direction. When a shear force higher than CRSS is accumulated in the crystal, gliding may occur at a specific point of a specific particle similar to the dislocation motion in a dielectric grain G and may spread to the entire surface, at which a plane defect may occur.

Dislocation may be one of the line defects, and may be similar to plane defect in that dislocation has a lattice defect in the dielectric grain, but differently from a plane defect, the direction of the defect may not be constant, and when observed through an electron microscope, dislocation may be observed in the form of a curved line rather than a linear line. Other methods and/or tools appreciated by one of ordinary skill in the art, even if not described in the present disclosure, may also be used.

As a method for confirming the twin boundary t on the TEM image, after confirming a linear line crossing from one end of the grain to the other end based on a specific single dielectric grain, when the contrast of both particles is different based on the linear line, this linear line may be referred to as a twin boundary t.

When there are two linear lines crossing from one end to the other end within a particle, when the two linear lines are parallel and the particles present between the two linear lines are different in contrast from the particles facing each other on the basis of the linear line, it may be considered that two twin boundaries are created within one particle. In this case, the particles on both ends may have the same contrast.

In the example embodiment, a dielectric grain G in which a twin boundary t is formed may be defined as a dielectric grain including a twin, and to refer differently to internal grains with different lattice arrangements based on the twin boundary t within the dielectric grain, the grains may be described as first internal grains or second internal grains. However, an example embodiment thereof is not limited thereto.

More specifically, referring to FIG. 5 illustrating a dielectric grain, which is a microstructure in a dielectric layer, when a single twin boundary t1 occurs in a dielectric grain, a dielectric grain G1 including a first internal grain G1a and a second internal grain G1b may be formed. In this case, the first internal grain G1a and the second internal grain G1b may be 180° symmetrical with respect to the twin boundary t1.

Also, when a double twin boundary t2 occurs in a dielectric grain, a dielectric grain G2 including a 1-1 internal grain G2a, a second internal grain G2b, and a 1-2 internal grain G2a' may be formed. In this case, the 1-1 internal grain G2a and the second internal grain G2b may be 180° symmetrical with respect to the first twin boundary t2a, and the second internal grain G2b and 1-2 The internal grain G2a' may be 180° symmetrical with respect to the second twin boundary t2b. In other words, the 1-1 internal grain G2a and the 1-2 internal grain G2a' may have the same lattice arrangement.

Among the dielectric grains G, a dielectric grain G3 in which the twin boundary t is not formed may be present, and in this case, the lattice arrangement in the dielectric grain G3 may be the same.

FIGS. 6A and 6B are images of a dielectric layer taken with a transmission electron microscope (TEM). FIG. 6A is a TEM image obtained by observing an arbitrary 2 μm×2 μm region of the dielectric layer at low magnification, and FIG. 6B is a TEM image obtained by observing an arbitrary 1 μm×1 μm region of the dielectric layer at high magnification.

Referring to FIG. 6, one dielectric grain may include a first internal grain G1a and a second internal grain G1b observed as contrast on the basis of a single twin boundary t1. Also, one of dielectric grains may include a 1-1 internal grain G2a, a second internal grain G2b and a 1-2 internal grain G2a' observed as contrast. For reference, the dislocation D may be observed as a line similar to the twin boundary t within the dielectric grain, but dislocation D may not be a line completely crossing the dielectric grain, and dislocation D may be observed in the form of a curved line rather than a linear line.

The length of the twin boundary t may be measured by observing the dielectric grains included in the dielectric layer 111 using a Transmission Electron Microscope (TEM) after disassembling the multilayer electronic component, and may be measured by measuring the length of the defect included in the dielectric grain in a TEM device. Other methods and/or tools appreciated by one of ordinary skill in the art, even if not described in the present disclosure, may also be used.

More specifically, in the image scanned in the bright field or dark field image mode for a TEM sample made with a focused ion beam (FIB), the length may be measured by measuring the length of the twin boundary t disposed within the dielectric grain, and when a plurality of twin boundary t are present, the length may be obtained by summing the lengths of the entirety of twin boundary t measured by the above method.

According to an example embodiment, the dielectric layer 111 may include a region in which the sum of the lengths of twin boundaries t included in a 2 μm×2 μm region (unit region) is 1.49 μm or more, and a preferred upper limit may be less than 5.31 μm, and a more preferred upper limit may be 3.63 μm or less.

Here, the sum of the lengths of the twin boundaries t included in the unit region in the dielectric layer 111 may be 1.49 μm or more may be indicate that at least one region in which the sum of the lengths of twin boundaries t included in the unit region of the dielectric layer 111 is 1.49 μm or more based on cross-sections of the multilayer electronic component 100 in the first and second directions may be present. Preferably, when observing three regions of a random 2 μm×2 μm region in the dielectric layer 111, the average value of the sum of the lengths of twin boundaries t included in each region may satisfy 1.49 μm or more.

The size of the unit region is not limited to the 2 μm×2 μm region, and may include a region within the range, for example, a 1 μm×1 μm region.

When the sum of the lengths of the twin boundary t satisfies 1.49 μm or more, high dielectric capacitance, X7R or X7S properties may be satisfied, and high-temperature reliability may be presented.

More specifically, at least one of properties of dielectric constant ≥2500, DC-bias capacitance change rate ≥−70% at 4 V/μm, an average failure life of 125 hours or more under an accelerated test condition to which an 45 V/μm electric field is applied at 150° C., insulation resistance (IR)≥1.0E+07Ω, and TCC≤±22% (−22% to +22%) in a temperature range of −55° C. to 125° C. may be satisfied, and more preferably, the entirety of properties may be satisfied.

When the sum of the lengths of the twin boundary t is less than 1.49 μm or greater than 5.31 μm, there may be a concern that at least one of properties of dielectric constant ≥2500, DC-bias capacitance change rate ≥−70% at 4 V/μm, an average failure life of 125 hours or more under an accelerated test condition to which an 45 V/μm electric field is applied at 150° C., insulation resistance (IR)≥1.0E+07Ω, and TCC≤±22% (−22% to +22%) in a temperature range of −55° C. to 125° C. may not be satisfied.

The sum of the number of twin boundaries t included in the 2 μm×2 μm region may not be limited to any particular example, and a preferable lower limit may be 10 or more, a preferable upper limit is less than 34, and a more preferable upper limit.

When the sum of the numbers of twin boundaries t satisfies the aforementioned range, more specifically, at least one of properties of dielectric constant ≥2500, DC-bias capacitance change rate ≥−70% at 4 V/μm, an average failure life of 125 hours or more under an accelerated test condition to which an 45 V/μm electric field is applied at 150° C., insulation resistance (IR)≥1.0E+07Ω, and TCC≤±22% (−22% to +22%) in a temperature range of −55° C. to 125° C. may be satisfied, and more preferably the entirety of properties may be satisfied.

When the sum of the number of twin boundaries t is less than 10 or more than 34, there may be a concern that at least one of properties of dielectric constant ≥2500, DC-bias capacitance change rate ≥−70% at 4 V/μm, an average failure life of 125 hours or more under an accelerated test condition to which an 45 V/μm electric field is applied at 150° C., insulation resistance (IR)≥1.0E+07Ω, and TCC≤±22% (−22% to +22%) in a temperature range of −55° C. to 125° C. may not be satisfied.

Hereinafter, subcomponents which may be included in the aforementioned dielectric composition will be described in detail. The subcomponent described here will be described based on the amount of oxide or carbonate of the additive before sintering, but the element content before and after sintering may not have a large error value unless there are special circumstances, and it will be apparent to those skilled in the art that the element content may be measured by various measuring methods such as SEM-EDS or TEM-EDS in the state of the chip after sintering. Other methods and/or tools appreciated by one of ordinary skill in the art, even if not described in the present disclosure, may also be used.

a) First Subcomponent

According to an example embodiment, the dielectric composition may further include a first subcomponent including at least one of an oxide or a carbonate of a valence variable acceptor element, and the valence variable acceptor element may include one or more of Mn, V, Cr, Fe, Ni, Co, and Zn, and the content of the first subcomponent may be 0.2 mol or more and 0.8 mol or less based on 100 mol of the main component.

The valence variable acceptor element included in the first subcomponent may improve sintering temperature reduction and high-temperature withstand voltage properties of a multilayer electronic component to which a dielectric composition is applied.

When the content of the first subcomponent is less than 0.2 mol or greater than 0.8 mol, dielectric constant or high-temperature withstand voltage properties may deteriorate.

b) Second Subcomponent

According to an example embodiment, the dielectric composition may further include a second subcomponent including at least one of an oxide or a carbonate of Mg, and the content of the second subcomponent may be 0.3 mol or more and 1.2 mol or less based on 100 mol of the main component.

Mg of the second subcomponent may increase high-temperature properties.

However, when the content of the second subcomponent is less than 0.3 mol, there may be a concern that DF, insulation resistance, X7S temperature properties, DC-bias properties, and high-temperature reliability may be deteriorated. When the content of the second subcomponent exceeds 1.2 mol, there may be a concern that X7S temperature properties may deteriorate.

c) Third Subcomponent

According to an example embodiment, the dielectric composition may further include a third subcomponent including at least one of an oxide and a carbonate of a rare earth element, the rare earth element may include at least one of Y, Dy, Tb, Ho, Er, Gd, Ce, Nd, Sm, Tm, La, and Yb, and the content of the third subcomponent may be 1.6 moles or more and 3.2 moles or less based on 100 moles of the main component.

The rare earth element included in the third subcomponent may improve high-temperature withstand voltage properties.

When the content of the third subcomponent is less than 1.6 mol or greater than 3.2 mol based on 100 mol of the main component, there may be a concern that room temperature dielectric constant or insulation resistance properties may be deteriorated.

e) Fourth Subcomponent

According to an example embodiment, the dielectric composition may further include a fourth subcomponent including at least one of an oxide of Si, a carbonate of Si, and a glass including Si, and the content of the fourth subcomponent may be 1.0 mol or more and 2.0 mol or less based on 100 mol of the main component.

Si included in the fourth subcomponent may improve a dielectric constant and DC-bias properties by improving sintering density.

When the content of the fourth subcomponent is less than 1.0 mol or greater than 2.0 mol based on 100 mol of the main component, sintering density may be low, such that dielectric constant and DC-bias properties may be deteriorated.

The thickness td of the dielectric layer 111 may not be limited to any particular example.

However, to easily implement a reduced size and high capacitance of the multilayer electronic component 100, the thickness td of the dielectric layer 111 may be 3.0 μm or less. To easily obtain miniaturization and high capacitance of the multilayer electronic component, the thickness of the dielectric layer 111 may be 1.0 μm or less, preferably 0.6 μm or less, and more preferably 0.4 μm or less.

Here, the thickness td of the dielectric layer 111 may refer to an average thickness of the dielectric layer 111 disposed between the first and second internal electrodes 121 and 122.

The thickness td of the dielectric layer 111 may refer to the size of the dielectric layer 111 in the first direction. Also, the thickness td of the dielectric layer 111 may refer to the average thickness td of the dielectric layer 111 and may refer to the average size of the dielectric layer 111 in the first direction.

The average thickness of the dielectric layer 111 may be measured by scanning a cross-section of the body 110 in the first and second directions using a scanning electron microscope (SEM) with a magnification of 10,000. More specifically, an average value may be measured from the thicknesses of the dielectric layer 111 at 30 points spaced apart by an equal distance in the first direction in the scanned image. The 30 points at equal distances may be designated in the active portion Ac. Also, when the average value is measured by extending the measurement of the average value to ten dielectric layers 111, the average thickness of the dielectric layer 111 in the first direction may be further generalized. Other methods and/or tools appreciated by one of ordinary skill in the art, even if not described in the present disclosure, may also be used.

The internal electrodes 121 and 122 may be alternately laminated with the dielectric layer 111.

The internal electrodes 121 and 122 may include a first internal electrode 121 and a second internal electrode 122, the first and second internal electrodes 121 and 122 may be alternately disposed to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

The body 110 may be formed by alternately laminating ceramic green sheets on which the first internal electrodes 121 are printed and ceramic green sheets on which the second internal electrodes 122 are printed, and sintering the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but an example embodiment thereof is not limited thereto.

The thickness te of the internal electrodes 121 and 122 may not need to be limited to any particular example.

However, to easily implement miniaturization and high capacitance of the multilayer electronic component 100, the thickness te of the internal electrodes 121 and 122 may be 1.0 μm or less. To more easily obtain miniaturization and high capacitance of the multilayer electronic component, the thickness of the internal electrodes 121 and 122 may be 0.6 μm or less, more preferably 0.4 μm or less.

Here, the thickness te of the internal electrodes 121 and 122 may refer to the size of the internal electrodes 121 and 122 in the first direction. Also, the thickness te of the internal electrodes 121 and 122 may refer to the average thickness te of the internal electrodes 121 and 122, and may refer to the average size of the internal electrodes 121 and 122 in the first direction.

The average thickness of the internal electrodes 121 and 122 may be measured by scanning a cross-section of the body 110 in the first and second directions using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized. Other methods and/or tools appreciated by one of ordinary skill in the art, even if not described in the present disclosure, may also be used.

Meanwhile, in an example embodiment, the average thickness td of at least one of the plurality of dielectric layers 111 and the average thickness te of at least one of the plurality of internal electrodes 121 and 122 may satisfy 2×te<td.

In other words, the average thickness td of one dielectric layer 111 may be greater than twice the average thickness te of one internal electrode 121 or 122. Preferably, the average thickness td of the plurality of dielectric layers 111 may be greater than twice the average thickness te of the plurality of internal electrodes 121 and 122.

Generally, a reliability issue due to a decrease in a breakdown voltage (BDV) in a high voltage environment may be problematic in electronic components for high voltage electric vehicles.

Accordingly, to prevent a decrease in breakdown voltage under a high voltage environment, by configuring the average thickness td of the dielectric layer 111 larger than twice the average thickness te of the internal electrodes 121 and 122, the thickness of the dielectric layer, which is the distance between the internal electrodes, may be increased, and breakdown voltage properties may improve.

When the average thickness td of the dielectric layer 111 is less than twice the average thickness te of the internal electrodes 121 and 122, the average thickness of the dielectric layer, which is the distance between the internal electrodes, may be thin such that breakdown voltage may be reduced, and a short circuit between internal electrodes may occur.

In a high voltage electronic component, an average thickness te of internal electrodes may be 1 μm or less and more than 0 μm, and an average thickness td of a dielectric layer may be 3.0 μm or less and more than 0 μm, but an example embodiment thereof is not limited thereto.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, respectively, and may basically prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portion 112 and 113 may not need to be limited to any particular example.

However, to easily obtain miniaturization and high capacitance of multilayer electronic components, the thickness tc of the cover portions 112 and 113 may be 100 μm or less, preferably 30 μm or less. More preferably, the thickness may be 20 μm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average thickness of the cover portions 112 and 113 may be measured by scanning a cross-section of the body 110 in the first and second directions using a scanning electron microscope (SEM) with a magnification of 10,000. More specifically, an average value may be measured from the thicknesses of the cover portion at 30 points spaced apart by an equal distance in the first direction in the scanned image. Other methods and/or tools appreciated by one of ordinary skill in the art, even if not described in the present disclosure, may also be used.

The multilayer electronic component 100 may include side margin portions 114 and 115 disposed on both end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110.

As illustrated, the side margin portions 114 and 115 may refer to a region between both end-surfaces of the first and second internal electrodes 121 and 122 in the third direction and the boundary surface of the body 110 with respect to the cross-section of the body 110 in the first and third directions.

The side margin portions 114 and 115 may be formed by forming internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The first side margin portion 114 and the second side margin portion 115 may basically prevent damages to the internal electrodes 121 and 122 due to physical or chemical stress.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$) ceramic material.

Meanwhile, the width wm of the first and second side margin portions 114 and 115 may not need to be limited to any particular example.

However, to easily obtain miniaturization and high capacitance of the multilayer electronic component 100, the width wm of the side margin portions 114 and 115 may be 100 μm or less, preferably 30 μm or less, and may be more preferably 20 μm or less in ultra-small products.

Here, the width wm of the side margin portions 114 and 115 may refer to the size of the side margin portions 114 and 115 in the third direction. Also, the width wm of the side margin portions 114 and 115 may refer to the average width wm of the side margin portions 114 and 115, and the average size of the side margin portions 114 and 115 in the third direction.

The average size of the side margin portion 114 and 115 in the third direction may be measured by scanning a cross-section of the body 110 in the first and third directions using a scanning electron microscope (SEM) with a magnification of 10,000. More specifically, the average size may be an average value measured from the size in the third direction at 30 points spaced apart from each other by an equal distance in the first direction in the scanned image of one of the side margin portion. Other methods and/or tools appreciated by one of ordinary skill in the art, even if not described in the present disclosure, may also be used.

In an example embodiment, the multilayer electronic component 100 may have two external electrodes 131 and 132, but the number or shape of the external electrodes 131 and 132 may be varied depending on the forms of the internal electrode 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers 131a, 132a, 131b, and 132b disposed on the body 110 and plating layers 131c and 132c disposed on the electrode layers 131a, 132a, 131b, and 132b.

For a more specific example of the electrode layers 131a, 132a, 131b, and 132b, the electrode layers 131a, 132a, 131b, and 132b may be sintered electrodes including a first conductive metal and glass, or a second conductive metal and resin.

Here, the first conductive metal may refer to a conductive metal included in the first electrode layers 131a and 132a, and the second conductive metal may refer to a conductive metal included in the second electrode layers 131b and 132b. In this case, the first conductive metal and the second conductive metal may be the same or different, and may include the same metal material, but an example embodiment thereof is not limited thereto.

Also, the electrode layers 131a, 132a, 131b, and 132b may have a form in which a plastic electrode and a resin-based electrode are formed in order on the body.

Also, the electrode layers 131a, 132a, 131b, and 132b may be formed by transferring a sheet including a conductive metal onto a body or by transferring a sheet including a conductive metal onto a sintered electrode.

A material having excellent electrical conductivity may be used as the conductive metal included in the electrode layers 131a, 132a, 131b, and 132b. For example, the conductive metal may include one or more selected from a group consisting of nickel (Ni), copper (Cu), palladium (Pd), silver (Ag), gold (Au), platinum (Pt), tin (Sn), tungsten (W), titanium (Ti) and alloys thereof, but an example embodiment thereof is not limited thereto.

In an example embodiment, the electrode layers 131a, 132a, 131b, and 132b may have a two-layer structure including first electrode layers 131a and 132a and second electrode layers 131b and 132b, and accordingly, the external electrodes 131 and 132 may include first electrode layers 131a and 132a including a first conductive metal and glass, and second electrode layers 131b and 132b disposed on the first electrode layers 131a and 132a and including a second conductive metal and resin.

The first electrode layers 131a and 132a may include glass, thereby improving bonding with the body 110, and the second electrode layers 131b and 132b may include resin, thereby improving bending strength.

The conductive metal used in the first electrode layers 131a and 132a is not limited to any particular example as long as the metal may be electrically connected to the internal electrodes 121 and 122 to form capacitance. For example, the metal may include one or more selected from a group consisting of nickel (Ni), copper (Cu), palladium (Pd), silver (Ag), gold (Au), platinum (Pt), tin (Sn), tungsten (W), titanium (Ti) and alloys thereof. The first electrode layers 131a and 132a may be formed by applying a conductive paste prepared by adding glass frit to the conductive metal powder and sintering the powder.

The conductive metal included in the second electrode layers 131b and 132b may serve to be electrically connected to the first electrode layers 131a and 132a.

The conductive metal included in the second electrode layers 131b and 132b is not limited to any particular example as long as the metal may be electrically connected to the electrode layers 131a and 132a, and may include one or more selected from a group consisting of nickel (Ni), copper (Cu), palladium (Pd), silver (Ag), gold (Au), platinum (Pt), tin (Sn), tungsten (W), titanium (Ti) and alloys thereof.

The conductive metal included in the second electrode layers 131b and 132b may include at least one of spherical particles and flake particles. That is, the conductive metal may consist of only flake-shaped particles, only spherical particles, or may be a mixture of flake-shaped particles and spherical particles. Here, the spherical particle may also include a shape not perfectly spherical, and may include a shape in which, for example, a length ratio between a major axis and a minor axis (long axis/short axis) is 1.45 or less. The flake-shaped particle may refer to a particle having a flat and elongated shape, and is not limited to any particular example, but, for example, the length ratio of the major axis to the minor axis (long axis/short axis) may be 1.95 or more. The lengths of the major and minor axes of the spherical particles and the flake-shaped particles may be measured from images obtained by scanning cross-sections in the first and second directions, cut-out at the center of the ceramic electronic component in the third direction, using a scanning electron microscope (SEM). Other methods and/or tools appreciated by one of ordinary skill in the art, even if not described in the present disclosure, may also be used.

Resin included in the second electrode layers 131b and 132b may secure bonding properties and may absorb impact. The resin included in the second electrode layers 131b and 132b is not limited to any particular example as long as the region may have bonding properties and impact absorption and may be mixed with conductive metal powder to form a paste, and may include, for example, an epoxy resin.

Also, the second electrode layers 131b and 132b may include a plurality of metal particles, an intermetallic compound, and a resin. As the intermetallic compound is included, electrical connectivity with the first electrode layers 131a and 132a may be improved. The intermetallic compound may improve electrical connectivity by connecting a plurality of metal particles, and may surround a plurality of metal particles and may connect the metal particles to each other.

In this case, the intermetallic compound may include a metal having a melting point lower than the curing temperature of the resin. That is, since the intermetallic compound includes a metal having a melting point lower than the curing temperature of the resin, the metal having a melting point lower than the curing temperature of the resin may be melted during a drying and curing process, and may form a intermetallic compound with portion of the metal particles and may enclose the metal particle. In this case, the intermetallic compound may preferably include a metal having a low melting point of 300° C. or less.

For example, Sn having a melting point of 213 to 220° C. may be included. During the drying and curing process, Sn may be melted, and the molten Sn may wet high-melting-point metal particles such as Ag, Ni, or Cu by capillarity, and may react with a portion of the Ag, Ni, or Cu metal particles, such that intermetallic compounds such as $Ag_3Sn$, $Ni_3Sn_4$, $Cu_6Sn_5$, and $Cu_3Sn$ may be formed. Ag, Ni or Cu not having participated in the reaction may remain in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$ and $Cu_3Sn$.

The plating layers 131c and 132c may improve mounting properties.

The type of the plating layers 131c and 132c is not limited to any particular example, and single-layer plating layers 131c and 132c including at least one of nickel (Ni), tin (Sn), palladium (Pd), and alloys thereof, and may include a plurality of layers.

For a more specific example of the plating layers 131c and 132c, the plating layers 131c and 132c may be Ni plating layers or Sn plating layers, and Ni plating layers and Sn plating layers may be formed in order on the electrode layers 131a, 132a, 131b, and 132b, and a Sn plating layer, a Ni plating layer, and a Sn plating layer may be formed in order. Also, the plating layers 131c and 132c may include a plurality of Ni plating layers and/or a plurality of Sn plating layers.

The size of the multilayer electronic component in an example embodiment is not limited to any particular example.

However, in the case of an electric MLCC, the multilayer electronic component may have a size of 3216 (length× width, 3.2 mm×1.6 mm) or a similar size to realize sufficient dielectric capacitance, but an example embodiment thereof is not limited thereto. Properties may be improved by generating twins even for small or ultra-small multilayer electronic components.

Although the example embodiments have been described in detail above, the example embodiment is not limited by the above-described embodiments and the accompanying drawings, but is limited by the appended claims. Accordingly, various forms of substitution, modification, and change may be made by those skilled in the art within the scope of the technical spirit of the present disclosure described in the claims, which also falls within the scope of the present disclosure.

Hereinafter, the example embodiment will be described in greater detail through experimental examples, but the scope of the present disclosure is not limited to the experimental examples.

Embodiment $BaTiO_3$ powder having an average particle size of 150 nm was used as the main component base material. Using zirconia beads as a mixing/dispersing medium, raw material powders including the main component $BaTiO_3$ powder and subcomponents corresponding to the compositions specified in Tables 1, 3, and 5 were mixed with ethanol/toluene solvent and dispersant to prepare a slurry, milling was performed for 4, 6, 8, 10, 20, and 30 hours, a binder was mixed, and additional milling was performed for 12 hours.

The prepared slurry was prepared into a molded sheet with a thickness of 5.0 μm using a molding machine for sheet production. Ni inner electrodes were printed on the forming sheet. The upper and lower cover parts were formed by laminating 25 dielectric layers, and a bar was formed by laminating 21 layers of printed active sheets while pressing. The compression bar was cut into chips having a size of 3216 (length×width: 3.2 mm×1.6 mm) using a cutting machine. The finished MLCC chip having a 3216 size was calcined and was sintered at a temperature of 1150-1200° C. in a reducing atmosphere of 0.1% $H_2$/99.9% $N_2$-0.5% $H_2$/99.5% $N_2$ ($H_2O/H_2/N_2$ atmosphere) under holding time of 2 hours, and re-oxidized for 3 hours in a $N_2$ atmosphere at 1040° C. Here, 0.1% of $H_2$ may correspond to the electromotive force of 680 mV and 0.5% of $H_2$ may correspond to the condition of the electromotive force of 760 mV in the partial oxygen pressure meter. By performing a termination process and electrode-sintering with Cu paste on the sintered chip, external electrodes were completed. Accordingly, after sintering, a MLCC chip of 3216 size having a dielectric thickness of approximately 2.2 μm and 20 dielectric layers was formed.

Room temperature dielectric capacitance C and dissipation factor DF of the MLCC Chip were measured at 1 kHz and AC 0.5 V/μm conditions using an LCR meter. The dielectric constant of the MLCC chip dielectric was calculated from the capacitance, dielectric thickness, internal electrode region, and number of layers of the MLCC chip. Room temperature insulation resistance IR was measured after 60 seconds in a state in which 10 samples were taken and DC 10 V/μm was applied. The change in dielectric capacitance with temperature (TCC) was measured in the temperature range of −55° C. to 125° C. The highly accelerated life time test (HALT) was performed by measuring the failure time by applying a voltage corresponding to an electric field of 42 V/μm at 150° C. for 40 specimens of each type, and calculating mean time to failure (MTTF). Tables 2, 4, and 6 list properties of prototype chips corresponding to the examples specified in Tables 1, 3, and 5.

In the example embodiment, a dielectric which may implement the entirety of these properties, such as high capacitance, X7R or X7S capacitance-temperature properties, and high high-temperature reliability, in a reducing atmosphere sintering conditions to which Ni internal electrodes may be applied, and an MLCC chip to which the same is applied may be implemented.

As a properties criterion for this purpose, the properties of dielectric constant ≥2500, DC-bias capacitance change rate ≥−70% at 4 V/μm, an average failure life of 125 hours or more under an accelerated test condition to which an 45 V/μm electric field is applied at 150° C., insulation resistance (IR)≥1.0E+07Ω, and TCC≤±22% (−22% to +22%) in a temperature range of −55° C. to 125° C. were targeted, and when the entirety of the above properties were satisfied, it was marked "O", and when even one of the properties was not satisfied, it was marked "X".

The added content of each subcomponent was presented in mol %, which may indicate the number of moles of added content compared to 100 moles of $BaTiO_3$ base material. For example, in embodiment 1-1, $MnO_2$ and $V_2O_3$, which are the first subcomponents, are described as 0.2 mol %, which may indicate that 0.2 mol of $MnO_2$ was added based on 100 mol of $BaTiO_3$ and 0.2 mol of $V_2O_3$ was added based on 100 mol of $BaTiO_3$.

TABLE 1

| Embodiment | Milling time [hrs] | Total amount of additives [%] | Sintering atmosphere (EMF) [mV] @850° C. | First subcomponent $MnO_2$ | First subcomponent $V_2O_5$ | Second subcomponent $MgCO_3$ | Third subcomponent $Dy_2O_3$ | Third subcomponent $Tb_4O_7$ | Fourth subcomponent $SiO_2$ |
|---|---|---|---|---|---|---|---|---|---|
| | | | | mol % | | | | | |
| 1-1 | 4 | 100 | 760 | 0.2 | 0.2 | 0.6 | 0.5 | 0.3 | 1.65 |
| 1-2 | 6 | 100 | 760 | 0.2 | 0.2 | 0.6 | 0.5 | 0.3 | 1.65 |
| 1-3 | 8 | 100 | 760 | 0.2 | 0.2 | 0.6 | 0.5 | 0.3 | 1.65 |
| 1-4 | 10 | 100 | 760 | 0.2 | 0.2 | 0.6 | 0.5 | 0.3 | 1.65 |
| 1-5 | 20 | 100 | 760 | 0.2 | 0.2 | 0.6 | 0.5 | 0.3 | 1.65 |
| 1-6 | 30 | 100 | 760 | 0.2 | 0.2 | 0.6 | 0.5 | 0.3 | 1.65 |
| 2-1 | 10 | 100 | 680 | 0.2 | 0.2 | 0.6 | 0.5 | 0.3 | 1.65 |
| 3-1 | 10 | 90 | 760 | 0.18 | 0.18 | 0.54 | 0.45 | 0.27 | 1.485 |
| 3-2 | 10 | 80 | 760 | 0.16 | 0.16 | 0.48 | 0.40 | 0.24 | 1.32 |
| 3-3 | 10 | 70 | 760 | 0.14 | 0.14 | 0.42 | 0.35 | 0.21 | 1.155 |
| 3-4 | 10 | 60 | 760 | 0.12 | 0.12 | 0.36 | 0.30 | 0.18 | 0.99 |

TABLE 2

Prototype MLCC chip properties

| Embodiment | Sum of total twin lengths * [μm] | Total number of twins | Room temperature dielectric constant ≥2500 | DF [%] ≤10 | IR [Ω] @150° C. ≥1.0E+7 | TCC [%] @−55° C. X7S | TCC [%] @125° C. | DC-bias change rate [%] ≥−70 | MTTF [hrs] @150° C. 45 V/μm ≥125 | Properties determination |
|---|---|---|---|---|---|---|---|---|---|---|
| 1-1 | 0.36 | 3 | 3482 | 5.74 | 1.3E+7 | −13.4 | −14.2 | −64 | 50 | X |
| 1-2 | 0.97 | 7 | 3210 | 5.82 | 1.5E+7 | −13.7 | −14.4 | −63.8 | 94 | X |
| 1-3 | 1.49 | 10 | 3008 | 6.11 | 2.1E+7 | −14.1 | −14.7 | −62.4 | 134 | O |
| 1-4 | 2.24 | 15 | 2796 | 6.55 | 4.7E+7 | −14.6 | −15.1 | −60.9 | 181 | O |
| 1-5 | 3.63 | 27 | 2512 | 6.92 | 8.3E+7 | −15.1 | −15.6 | −60.5 | 208 | O |
| 1-6 | 5.31 | 34 | 1958 | 7.37 | 1.2E+8 | −15.8 | −16.3 | −59.2 | 225 | X |

TABLE 2-continued

Prototype MLCC chip properties

| Embodiment | Sum of total twin lengths * [μm] | Total number of twins | Room temperature dielectric constant ≥2500 | DF [%] ≤10 | IR [Ω] @150° C. ≥1.0E+7 | TCC [%] @−55° C. X7S | TCC [%] @125° C. X7S | DC-bias change rate [%] ≥−70 | MTTF [hrs] @150° C. 45 V/μm ≥125 | Properties determination |
|---|---|---|---|---|---|---|---|---|---|---|
| 2-1 | 2.17 | 14 | 2796 | 6.55 | 3.6E+7 | −14.6 | −15.1 | −61.9 | 131 | ○ |
| 3-1 | 2.38 | 17 | 2805 | 6.62 | 4.9E+7 | −14.6 | −15.2 | −60.2 | 184 | ○ |
| 3-2 | 2.53 | 21 | 2824 | 6.57 | 3.1E+7 | −14.8 | −15.7 | −59.8 | 180 | ○ |
| 3-3 | 2.75 | 24 | 2997 | 6.31 | 1.8E+7 | −15.5 | −16.1 | −59.7 | 152 | ○ |
| 3-4 | 3.13 | 29 | 3153 | 6.14 | 8.1E+6 | −16.1 | −16.5 | −62.7 | 112 | X |

* twin observed region 2 μm × 2 μm (region excluding internal electrodes)

Embodiments 1-1 to 1-6 in Table 1 indicates an example according to the milling time of the batch process based on 100 mol of the main component $BaTiO_3$ base material, when the sum of the first subcomponent valency variable elements $MnO_2$ and $V_2O_3$ was 0.4 mol ($MnO_2$ of 0.2 mol), the content of the second subcomponent $MgCO_3$ was 0.6 mol, the sum of the third subcomponent $Dy_2O_3$ and $Tb_4O_7$ was 0.8 mol ($Dy_2O_3$ of 0.5 mol), and the content of the fourth subcomponent $SiO_2$ was 1.65 mol, and Table 2 1-1 to 1-6 indicate properties of the prototype MLCC samples corresponding to these examples. At 4 hrs, the shortest batch milling time (embodiment 1-1), the sum of the total twin lengths was only 0.36 μm in an arbitrary region (2 μm×2 μm) in which (embodiment 1-1) only the dielectric was observed other than the internal electrode region, and in the accelerated test condition where the electric field of 45 V/μm is applied at a temperature of 150° C., the average failure life was low, 50 hours. When the milling time was increased to 6 hrs (embodiment 1-2), the sum of the total twin lengths increased to 0.97 μm and the MTTF increased to 94 hrs, which, however, does not meet the prototype MLCC chip properties determination.

When the batch milling time was increased to 8 hrs (embodiment 1-3), a dielectric layer having a total twin length sum of 1.49 μm was present, and in this case, the MTTF was 134 hrs, which is higher than that of embodiment 1-2. When the milling time was further increased to 10 and 20 hrs (Embodiments 1-4 and 1-5), the sum of the total twin lengths increased to 2.24 μm and 3.63 μm, and the MTTF was further improved to 181 hrs and 208 hrs. When the batch milling time was further increased to 30 hrs (embodiment 1-6), the sum of the total twin lengths was further increased and observed up to 5.31 μm, but the dielectric constant was lowered to less than 2000, which may be an adverse effect, and may not meet the properties determination. In the example embodiment, it may be indicated that when the total length of twins observed on the transmission electron microscope image increased as the milling time increases, the sum of the number of twins also increased, and the increase in the total number of twins was also proportional to the increase in MTTF. Accordingly, it may be indicated that the entirety of the target properties in the example embodiment may be realized by implementing a microstructure in which the sum of the twin lengths was 1.49 μm or more and the number of twins was 10 or more within the range in which the dielectric constant is 2500 or more.

In embodiment 2-1, the batch milling time and subcomponent of embodiment 1-4 were applied and sintering was performed in an EMF 680 mV (hydrogen concentration 0.1%) sintering atmosphere lower than the sintering atmosphere EMF 760 mV (hydrogen concentration 0.5%), and table 2 lists properties of a prototype MLCC sample corresponding to the embodiment. Although the same composition and batch milling conditions were applied, when the hydrogen concentration was lowered, the sum of the total twin lengths was 2.17 μm, which did not change significantly, and the target properties in the example embodiment, MTTF of 125 hrs or more was realized, but decreased to 131 hrs, which was lower than the MTTF 181 hrs in embodiment 1-4.

In embodiments 3-1 to 3-4, as compared to embodiment 1-4, the prototype MLCC chip properties were compared by reducing only the additive content at 10% intervals under the same batch milling time and hydrogen concentration conditions. In Embodiment 3-1, the chip properties were examined by reducing the additive content to 90%, and in this case, the total twin length was 2.38 μm, and the total number of twins was 17, which was an increase from embodiment 1-4. When the total amount of additives was reduced, the amount of additives forming the core-shell structure with $BaTiO_3$ was reduced, such that the grain growth fraction of $BaTiO_3$ increased, which may cause dielectric constant/DF increase, TCC deterioration, and MTTF deterioration. Embodiment 3-1 indicates a tendency of dielectric constant/DF increase and TCC deterioration (compared to Embodiment 1-4), but the DC-bias properties was rather improved, and TCC and MTTF were not reduced. Although the additive content was reduced, the total twin length and the total number of twins tended to be equal or increase, such that it may be indicated that the DC-bias change rate was improved and the TCC and MTTF properties were equal due to the formation of more boundaries. In embodiment 3-2, the additive content was reduced by 80%, and it may be indicated that the sum of the total twin length compared to 100% of the additive increased to 2.53 μm and the total number of twins increased to 21. This embodiment also indicates an increase in dielectric constant/DF and a tendency of high temperature IR reduction and TCC deterioration due to the effect of reducing additives by 20%, but MTTF had an almost similar aspect to the previous embodiment. Embodiment 3-3 corresponds to 70% of the total amount of additives and indicates deterioration in properties in the same trend as embodiment 3-2. The sum and number of total twin lengths increased to 2.75 μm and 24, but the additive reduction effect was large such that the grain growth was further promoted, and the MTTF decreased to 152 hrs. In embodiment 3-4, the total amount of additives was reduced by 60%, and the tendency of dielectric constant increase and TCC deterioration was indicated. Due to the reduction in the amount of additives required to form the core-shell structure, a larger impact was transmitted to the $BaTiO_3$ base material to promote twin generation, but because the core-shell structure fraction was significantly reduced, such that grain growth occurred, and the MTTF also was 112 hrs, which was less than 125 hr.

Accordingly, to realize the target properties in the example embodiment, it may be indicated that, although the sum and number of total twin lengths reach embodiment 1-4 or more, the high-temperature IR and MTTF properties may be satisfied only when the total amount of the additive is maintained at 70% or more. Embodiments 3-1 to 3-4 may correspond to the most important embodiments among the embodiment, and despite reducing the total amount of additives, due to the increased number of twin boundaries in the same milling conditions, the same level of prototype chip properties was implemented such that competitiveness in reducing the unit cost of chip manufacturing was obtained.

added (embodiment 4-4), high temperature IR and MTTF properties were unsatisfactory due to lack of reduction resistance. When 0.4 mol % of $MnO_2$ (embodiments 4-5) and $V_2O_5$ (embodiments 4-6) were added alone, the properties were not satisfied in both cases. Accordingly, the total content of the first subcomponent for realizing the target properties in the example embodiment may be 0.2 mol % or more and 0.8 mol % or less in terms of mole ratio. In the example embodiment, the sum and number of twin lengths changed according to the change in the content of the first subcomponent, but the difference may be regarded to be within the error range, such that it is indicated that the prototype chip properties were driven by the change in the content of the first subcomponent.

In embodiment 5-1 to 5-4, when the second subcomponent $MgCO_3$ was added, there may be an effect of suppressing grain growth and increasing the time constant (RC)

TABLE 3

| Embodiment | Milling time [hrs] | Total amount of additives [%] | Sintering atmosphere (EMF) [mV] @850° C. | First subcomponent $MnO_2$ | First subcomponent $V_2O_5$ | Second subcomponent $MgCO_3$ | Third subcomponent $Dy_2O_3$ | Third subcomponent $Tb_4O_7$ | Fourth subcomponent $SiO_2$ |
|---|---|---|---|---|---|---|---|---|---|
| | | | | | | mol % | | | |
| 4-1 | 10 | 135 | 760 | 0.8 | 0.8 | 0.6 | 0.5 | 0.3 | 1.65 |
| 4-2 | 10 | 112 | 760 | 0.4 | 0.4 | 0.6 | 0.5 | 0.3 | 1.65 |
| 4-3 | 10 | 94 | 760 | 0.1 | 0.1 | 0.6 | 0.5 | 0.3 | 1.65 |
| 4-4 | 10 | 88 | 760 | 0.0 | 0.0 | 0.6 | 0.5 | 0.3 | 1.65 |
| 4-5 | 10 | 100 | 760 | 0.4 | 0.0 | 0.6 | 0.5 | 0.3 | 1.65 |
| 4-6 | 10 | 100 | 760 | 0.0 | 0.4 | 0.6 | 0.5 | 0.3 | 1.65 |
| 5-1 | 10 | 135 | 760 | 0.2 | 0.2 | 1.8 | 0.5 | 0.3 | 1.65 |
| 5-2 | 10 | 117 | 760 | 0.2 | 0.2 | 1.2 | 0.5 | 0.3 | 1.65 |
| 5-3 | 10 | 91 | 760 | 0.2 | 0.2 | 0.3 | 0.5 | 0.3 | 1.65 |
| 5-4 | 10 | 83 | 760 | 0.2 | 0.2 | 0.0 | 0.5 | 0.3 | 1.65 |

TABLE 4

Prototype MLCC chip properties

| Embodiment | Sum of total twin lengths * [μm] | Total amount of additives | Room temperature dielectric constant ≥2500 | DF [%] ≤10 | IR [Ω] @150° C. ≥1.0E+7 | TCC [%] @-55° C. X7S | TCC [%] @125° C. X7S | DC-bias change rate [%] ≥-70 | MTTF [hr] @150° C. 45 V/μm ≥125 | Properties determination |
|---|---|---|---|---|---|---|---|---|---|---|
| 4-1 | 2.24 | 15 | 2354 | 5.44 | 2.4E+7 | -20.5 | -23.5 | -70.4 | 123 | X |
| 4-2 | 2.22 | 14 | 2648 | 6.24 | 6.8E+7 | -16.1 | -17.2 | -66.7 | 197 | ○ |
| 4-3 | 2.31 | 16 | 2506 | 5.88 | 4.1E+7 | -16.5 | -17.9 | -65.4 | 141 | ○ |
| 4-4 | 2.35 | 17 | 2003 | 4.72 | 5.7E+6 | -21.4 | -25.1 | -71.5 | 86 | X |
| 4-5 | 2.27 | 15 | 2581 | 6.17 | 1.4E+7 | -20.1 | -24.9 | -70.2 | 118 | X |
| 4-6 | 2.25 | 14 | 2101 | 4.89 | 2.7E+7 | -16.4 | -17.8 | -65.7 | 155 | X |
| 5-1 | 2.23 | 14 | 2186 | 5.28 | 2.2E+7 | -23.7 | -20.5 | -68.7 | 164 | X |
| 5-2 | 2.27 | 15 | 2544 | 6.17 | 7.1E+7 | -21.2 | -19.4 | -67.4 | 176 | ○ |
| 5-3 | 2.36 | 15 | 2912 | 6.64 | 3.8E+7 | -18.5 | -19.4 | -69.2 | 128 | ○ |
| 5-4 | 2.5 | 20 | 3984 | 10.7 | 7.1E+6 | -24.5 | -23.7 | -74.3 | 82 | X |

* twin observed region 2 μm × 2 μm (region excluding internal electrodes)

Embodiment 4-1 to 4-6 and embodiment 5-1 to 5-4 in Table 3 are embodiments according to the change in the content of the first subcomponent and the second subcomponent based on 100 mol of the main component 150 nm $BaTiO_3$ base material and Table 4 lists properties of the samples corresponding to these embodiments. In Embodiment 4-1 to 4-6, when the sum of $MnO_2$ and $V_2O_5$ elements, which are the first subcomponent, was added in an amount of 1.6 mol % or more, the DC-bias change rate and MTTF properties were not satisfied. When the two elements were added at 0.1 mol % each, the target properties may be realized (Embodiment 4-3), and when the elements were not value. When the second subcomponent $MgCO_3$ was 1.8 mol %, which is excessive, dielectric constant of 2500 or less was obtained due to grain growth suppression and MTTF properties was less than 125 hrs, which is the target value of the example embodiment, such that properties were not implemented. When $MgCO_3$ is not added, it may be indicated that most of the properties are not satisfied, such as DF increase due to excessive grain growth, IR decrease at high temperature, unsatisfactory X7S properties, and MTTF of 82 hrs. Accordingly, the content of the second subcomponent for realizing the target properties in the example embodiment may be 0.3 mol % or more and 1.2 mol %. Similarly, the change in the content of the second subcomponent caused a change in the total amount of the additive, which led to a change in the total twin length and number. Although the degree of change in the length and number of twin boundaries further increased compared to embodiment 4, it may be indicated that the effect of the change in content was greater than the effect of the change induced in the twin.

properties. Accordingly, it may be indicated that the optimal molar ratio of rare earth elements in the complex system of $Dy_2O_3$ and $Tb_4O_7$ may have a ratio of 1.6 mol % or more and 3.2 mol % or less. The minimum twin length derived from embodiment 6 was 2.03 μm, which may have a distribution of twins which may appear when disintegration/mixing based on 100% additives is performed for 8 hrs or more. It

TABLE 5

| Embodiment | Milling time [hrs] | Total amount of additives [%] | Sintering atmosphere (EMF) [mV] @850° C. | First subcomponent $MnO_2$ | First subcomponent $V_2O_5$ | Second subcomponent $MgCO_3$ | Third subcomponent $Dy_2O_3$ mol % | Third subcomponent $Tb_4O_7$ mol % | Fourth subcomponent $SiO_2$ |
|---|---|---|---|---|---|---|---|---|---|
| 6-1 | 10 | 216 | 760 | 0.2 | 0.2 | 0.6 | 3.0 | 1.8 | 1.65 |
| 6-2 | 10 | 170 | 760 | 0.2 | 0.2 | 0.6 | 2.0 | 1.2 | 1.65 |
| 6-3 | 10 | 123 | 760 | 0.2 | 0.2 | 0.6 | 1.0 | 0.6 | 1.65 |
| 6-4 | 10 | 88 | 760 | 0.2 | 0.2 | 0.6 | 0.25 | 0.15 | 1.65 |
| 6-5 | 10 | 100 | 760 | 0.2 | 0.2 | 0.6 | 0.8 | 0 | 1.65 |
| 6-6 | 10 | 100 | 760 | 0.2 | 0.2 | 0.6 | 0 | 0.8 | 1.65 |
| 7-1 | 10 | 139 | 760 | 0.2 | 0.2 | 0.6 | 0.5 | 0.3 | 3.00 |
| 7-2 | 10 | 110 | 760 | 0.2 | 0.2 | 0.6 | 0.5 | 0.3 | 2.00 |
| 7-3 | 10 | 81 | 760 | 0.2 | 0.2 | 0.6 | 0.5 | 0.3 | 1.00 |
| 7-4 | 10 | 67 | 760 | 0.2 | 0.2 | 0.6 | 0.5 | 0.3 | 0.5 |

TABLE 6

Prototype MLCC chip properties

| Embodiment | Sum of total twin lengths * [μm] | Total number of twins | Room temperature dielectric constant ≥2500 | DF [%] ≤10 | IR [Ω] @150° C. ≥1.0E+7 | TCC [%] @-55° C. X7S | TCC [%] @125° C. X7S | DC-bias change rate [%] ≥-70 | MTTF [hr] @150° C. 45 V/μm ≥125 | Properties determination |
|---|---|---|---|---|---|---|---|---|---|---|
| 6-1 | 2.03 | 12 | 3532 | 7.81 | 9.4E+6 | -16.2 | -19.1 | -67.9 | 122 | X |
| 6-2 | 2.11 | 12 | 3120 | 6.96 | 2.1E+8 | -15.3 | -17.2 | -63.5 | 262 | ○ |
| 6-3 | 2.24 | 14 | 2876 | 6.71 | 8.5E+7 | -14.5 | -15.3 | -62.2 | 213 | ○ |
| 6-4 | 2.42 | 18 | 2654 | 6.23 | 9.8E+6 | -14.4 | -15.2 | -61.8 | 105 | X |
| 6-5 | 2.24 | 16 | 2418 | 5.47 | 5.7E+7 | -15.5 | -16.1 | -64.2 | 175 | X |
| 6-6 | 2.24 | 14 | 2523 | 5.78 | 5.4E+6 | -15.2 | -16.6 | -65.7 | 96 | X |
| 7-1 | 2.2 | 13 | 2245 | 11.5 | 7.2E+7 | -18.5 | -20.5 | -71.2 | 128 | X |
| 7-2 | 2.25 | 16 | 2981 | 8.24 | 5.1E+7 | -16.2 | -16.8 | -65.8 | 197 | ○ |
| 7-3 | 2.52 | 20 | 2536 | 5.87 | 4.6E+7 | -17.5 | -19.5 | -66.2 | 144 | ○ |
| 7-4 | 2.86 | 27 | 3432 | 9.45 | 8.8E+6 | -22.7 | -23.5 | -72.7 | 99 | X |

* twin observed region 2 μm × 2 μm (region excluding internal electrodes)

Embodiments 6-1 to 6-6 in Table 5 were prototype chip properties according to the change in the content of the third subcomponent $Dy_2O_3$ and $Tb_4O_7$. As in embodiment 6-1, when the third subcomponent was excessively added, high temperature IR was insufficient and MTTF properties was 122 hrs, such that as compared to MTTF of embodiments 6-2 and 6-3, in which appropriate amounts were added, MTTF was greatly reduced and stopped at less than the standard value of 125 hrs. In embodiment 6-4, when the sum of the third subcomponent was too small as 0.4 mol, the MTTF was 105 hrs, and the standard value of 125 hrs or more was not obtained. In embodiments 6-5 and 6-6, 0.8 mol of $Dy_2O_3$ and 0.8 mol % of $Tb_4O_7$ were added, respectively, and it may be indicated that even when 0.8 mol % was added individually, it was insufficient to obtain the properties. When only $Dy_2O_3$ of the two rare earth elements was added (embodiment 6-5), MTTF was obtained at 175 hrs, more than 125 hrs, but the dielectric constant was deteriorated, the standard value was not implemented. When only $Tb_4O_7$ of the two rare earth elements was added (embodiment 6-6), both MTTF and high-temperature IR were less than the standard values, which may not be suitable for obtaining may indicate that the twin change due to the changed total amount of additives does not have a significant effect on the properties determination, and that the change in the content of the third subcomponent plays a leading role in the prototype chip properties.

Embodiments 7-1 to 7-4 relate to prototype chip properties according to the content of the fourth subcomponent $SiO_2$. As in embodiment 7-1, when an excess of 3.0 mol % was added, due to secondary phase formation and Si agglomerate formation, the dielectric constant did not obtain the target value with 2245, and the DF also rose above 10. The DC-bias change rate also deteriorated, with a figure of -71.2%, which did not reach the target. In the case of the fourth subcomponent content of 2.0 mol % and 1.0 mol %, the properties were satisfied for the entirety of properties, while when the content was added at 0.5 mol % as in embodiment 7-4, due to the lack of liquid components, fluidity of the additives was not secured during the sintering process, resulting in grain growth. Also, it may be indicated that the implementation of properties was impossible due to the lack of high-temperature IR, deterioration of TCC, and insufficient MTTF of 125 hrs. Accordingly, in the case of the fourth subcomponent, it may be indicated that the properties in the example embodiment may be realized when the ratio is 1.0 mol % or more and 2.0 mol % or less. In the case of embodiment 7-4, the sum of the twin boundary lengths increased to 2.86 µm, but as the $SiO_2$ subcomponent reduction was the largest, even when the twin boundary increases, the embodiment did not reach the properties pass determination.

In the case of evaluating the embodiments in the example embodiment, the embodiment in which the entirety of properties of dielectric constant ≥2500, DC-bias capacitance change rate ≥−70% at 4 V/µm, an average failure life of 125 hours or more under an accelerated test condition to which an 45 V/µm electric field is applied at 150° C., insulation resistance (IR)≥1.0E+07Ω, and TCC≤±22% (−22% to +22%) in a temperature range of −55° C. to 125° C. were satisfied was marked O, but the possible effects may be varied due to the presence of twin.

According to the aforementioned example embodiments, room temperature dielectric constant, DC-bias properties, high temperature insulation resistance properties, high temperature TCC properties, withstand voltage properties and reliability may be improved.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and internal electrodes; and
an external electrode disposed on the body,
wherein the dielectric layer includes dielectric grains,
wherein at least one of the dielectric grains includes a twin boundary, and
wherein the dielectric layer includes a region in which a sum of lengths of twin boundaries included in a 2 µm×2 µm region is 1.49 µm or more.

2. The multilayer electronic component of claim 1, wherein the sum of lengths of the twin boundaries included in the 2 µm×2 µm region is 1.49 µm or more and 3.63 µm or less.

3. The multilayer electronic component of claim 1, wherein the dielectric layer includes a region in which 10 or more twin boundaries are included in a 2 µm×2 µm region.

4. The multilayer electronic component of claim 3, wherein 10 or more and 27 or less twin boundaries are included in the 2 µm×2 µm region is.

5. The multilayer electronic component of claim 1, wherein a plane direction of the twin boundary is {111}.

6. The multilayer electronic component of claim 1, wherein the twin boundary includes at least one of a single twin boundary and multiple twin boundaries.

7. The multilayer electronic component of claim 1,
wherein the dielectric layer includes a dielectric composition, and
wherein the dielectric composition includes a $BaTiO_3$-based main component.

8. The multilayer electronic component of claim 7,
wherein the dielectric composition further includes a first subcomponent including at least one of an oxide and a carbonate of a valence variable acceptor element,
wherein the valence variable acceptor element includes one or more of Mn, V, Cr, Fe, Co, Ni, Cu, Co, and Zn, and wherein a content of the first subcomponent is 0.2 mol or more and 0.8 mol or less based on 100 mol of the main component.

9. The multilayer electronic component of claim 7,
wherein the dielectric composition further includes a second subcomponent including at least one of an oxide or a carbonate of Mg, and
wherein a content of the second subcomponent is 0.3 mol or more and 1.2 mol or less based on 100 mol of the main component.

10. The multilayer electronic component of claim 7,
wherein the dielectric composition further includes a third subcomponent including at least one of an oxide and a carbonate of a rare earth element,
wherein the rare earth element includes at least one of Y, Dy, Tb, Ho, Er, Gd, Ce, Nd, Sm, Tm, La, and Yb, and
wherein a content of the third subcomponent is 1.6 mol or more and 3.2 mol or less based on 100 mol of the main component.

11. The multilayer electronic component of claim 7,
wherein the dielectric composition further includes a fourth subcomponent including at least one of Si oxide, carbonate, and glass including Si, and
wherein a content of the fourth subcomponent is 1.0 mol or more and 2.0 mol or less based on 100 mol of the main component.

12. The multilayer electronic component of claim 1,
wherein the dielectric layer includes dielectric layers, and
wherein an average thickness of at least one of the dielectric layers is 3.0 µm or less.

13. The multilayer electronic component of claim 1,
wherein an average thickness of at least one of the internal electrodes is 1.0 µm or less.

14. The multilayer electronic component of claim 1,
wherein the dielectric layer includes dielectric layers, and an average thickness of at least one of the dielectric layers is defined as td, and
wherein an average thickness of at least one of the internal electrodes is defined as te, and 2×te<td is satisfied.

15. The multilayer electronic component of claim 1, wherein the external electrode includes a first electrode layer including a first conductive metal and glass, and a second electrode layer disposed on the first electrode layer and including a second conductive metal and resin.

16. The multilayer electronic component of claim 1, wherein the multilayer electronic component satisfies at least one of dielectric constant ≥2500, DC-bias capacitance change rate ≥−70%, an average failure life of 125 hours or more under an accelerated test condition to which an 45 V/µm electric field is applied at 150° C., insulation resistance (IR)≥1.0E+07Ω, and TCC≤±22% in a temperature range of −55° C. to 125° C.

17. The multilayer electronic component of claim 8, wherein the valence variable acceptor element includes Mn and V.

18. The multilayer electronic component of claim 10, wherein the rare earth element includes Dy and Tb.

19. A method to manufacture the multilayer electronic component of claim 7, the method comprising:
forming the dielectric layer including milling the $BaTiO_3$-based main component for 8 to 20 hours.

20. The method of claim 19, wherein in the milling, the $BaTiO_3$-based main component is milled with a first subcomponent, a second subcomponent, a third subcomponent, and a fourth subcomponent for 8 to 20 hours, prior to mixing with a binder, the first subcomponent includes at least one of an oxide and a carbonate of a valence variable acceptor element,
the second subcomponent includes at least one of an oxide or a carbonate of Mg,
the third subcomponent includes at least one of an oxide and a carbonate of a rare earth element, and
the fourth subcomponent includes at least one of Si oxide, carbonate, and glass including Si.

* * * * *